United States Patent [19]

Feierabend et al.

[11] 4,062,659
[45] Dec. 13, 1977

[54] CONTOURING MAGNETIC HEAD SURFACES

[75] Inventors: Louis B. Feierabend; Otto R. Luhrs, both of Boulder, Colo.

[73] Assignee: International Business Machines Corporation, Armonk, N.Y.

[21] Appl. No.: 746,042

[22] Filed: Nov. 30, 1976

Related U.S. Application Data

[62] Division of Ser. No. 555,650, March 5, 1975, Pat. No. 4,010,574.

[51] Int. Cl.² .............................................. B24B 1/00
[52] U.S. Cl. ................................................ 51/281 R
[58] Field of Search ................ 51/121, 124, 165.77, 51/328, 281 R

[56] References Cited

U.S. PATENT DOCUMENTS

| | | | |
|---|---|---|---|
| 611,323 | 9/1898 | Johnston | 51/124 R |
| 1,076,012 | 10/1913 | Allsopp | 51/73 R |
| 2,454,472 | 11/1948 | Monkley | 51/124 R |
| 2,982,057 | 5/1961 | Stanhope | 51/73 |
| 2,982,058 | 5/1961 | Maitenaz | 51/124 R |
| 3,699,720 | 10/1972 | Lenning | 51/165.77 |

FOREIGN PATENT DOCUMENTS

| | | | |
|---|---|---|---|
| 767,175 | 1/1957 | United Kingdom | 51/124 R |

*Primary Examiner*—Harold D. Whitehead
*Attorney, Agent, or Firm*—Andrea P. Bryant

[57] ABSTRACT

A spherical wasp-waist shaped contour is formed on the surface of a magnetic head by rotating a lap plate against a single contact point on the head surface at a time. An arc along the head's length is defined by a fixed longitudinal radius. For each increment along the longitudinal arc, a different arc transverse thereto is defined by a variable transverse radius. The point of contact between the head and the lap plate moves along each transverse arc in sequence from one end of the longitudinal arc to the other and back again until the desired shape and depths are achieved. The longitudinal radius is fixed by the spacing selected between the lap plate on one side of the head and a longitudinal head rocking axis on the other side of the head. The transverse radius is determined by the spacing chosen between the lap plate and a transverse rocking axis placed on the same side of the head as the longitudinal rocking axis. The head is incremented to move its point of contact with the lapping plate along the longitudinal arc under the control of prespecified quantities. For each longitudinal increment, the contact point is moved along a transverse arc defined for that point on the longitudinal arc by prespecified quantities. The head is fed closer to the lap plate in steps until a predetermined quantity of surface material is removed.

5 Claims, 6 Drawing Figures

FIG. 3 (SHEET 1)

FIG. 3
(SHEET 2)

CONTOURING MAGNETIC HEAD SURFACES

This is a division, of application Ser. No. 555,650 filed March 5, 1975 and now U.S. Pat. No. 4,010,574 dated Nov. 8, 1977.

BACKGROUND OF THE INVENTION

1. Field of the Invention

The invention relates to an apparatus and method for manufacturing magnetic heads and, more particularly, to the formation of a surface thereon.

2. Description of the Prior Art

A magnetic head element is mounted in a housing which presents a surface area to magnetic media. The exact shape of this surface area has gained in importance with the development of extremely small batch-fabricated head elements expected to read or write very small signals at very high densities. The final contouring of the housing surface establishes both the element's throat height (which critically affects the element's magnetic efficiency) and the aerodynamic characteristics of the head housing. The latter characteristics are essential to separate the head and media, thus reducing wear, yet keep them close enough together so as to not unnecessarily reduce the magnetic and electrical interaction between the head and media.

Solutions to the throat height problems are addressed in Abbott et al U.S. Pat. No. 3,821,815, "Apparatus for Batch-Fabricating Magnetic Film Heads and Method Therefor," and L. A. Johnson et al U.S. Pat. No. 3,921,340, "Magnetic Head Surface Formation Apparatus and Method," both assigned to International Business Machines Corporation. This application is directed to the problem of forming a complex plural-radius contour on the surface of the head housing. In Abbott et al, a single radius may be formed by lapping the head surface with a loop of abrasive tape. The length of radius may be changed, identically for each point along the length of the head housing, by oscillating the housing against a grinding wheel under the control of an appropriately shaped cam. A more complex spherical surface contour is achieved in L. A. Johnson et al by spinning the head continuously against a contoured abrasive wheel.

Recent head designs, such as shown in Freeman et al U.S. Pat. No. 3,821,813, "Wasp-Waist Head for Flying Flexible Magnetic Storage Medium Over Head," assigned to International Business Machines Corporation, require even more complex contours which must be repeatedly reproducible without variation from sample-to-sample. Further, development of advanced head designs makes it desirable to be able to reproduce head contours identical to previously produced contours except in specified variable parameters. It is also desirable to make the specification of contour parameters independent of other surface related head dimensions, such as throat height.

SUMMARY OF THE INVENTION

This invention controls the generation of a surface contour defined by longitudinal radii, each forming an arc lying along the length of the head's surface, and transverse radii forming a series of arcs at right angles to the length. For example, the surface contour may have the general shape of an hourglass derived from a spherical surface. The longitudinal radius is determined by the distance between the head surface and the center of a longitudinal rocking axis. For each incremental angle of longitudinal arc, a different transverse radius may be selected by changing the distance between a transverse rocking axis and the finished head surface. If the head surface is formed by contact with an abrasive means, the transverse radii are measured between the transverse rocking axis and the abrasive means surface, the head surface at all times during adjustment of longitudinal and transverse radii remaining in contact with the abrasive. A variable longitudinal radius may also be obtained by changing the head position relative to the longitudinal rocking axis at selected longitudinal arc angles.

The foregoing and other features and advantages of the invention will be apparent from the following more particular description of preferred embodiments of the invention, as illustrated in the accompanying drawings.

DESCRIPTION OF THE PREFERRED EMBODIMENT

Figures 1A, 1B:
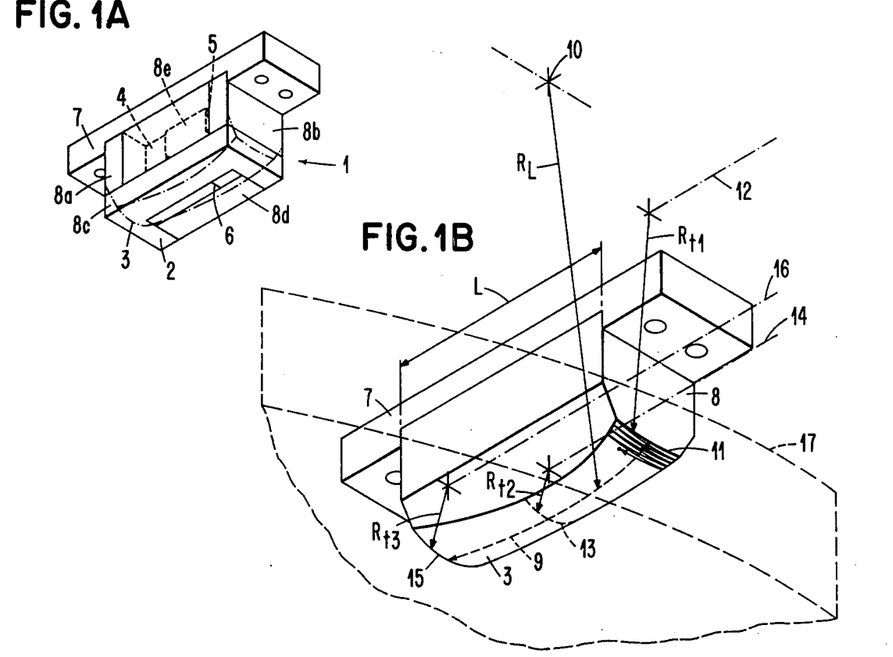
FIG. 1A shows a magnetic head assembled and ready for surface contouring.
FIG. 1B shows the head of FIG. 1A following surface contouring.

FIG. 1A shows the magnetic head of the type described in the referenced Freeman patent prior to contouring. The head 1 comprises an unfinished surface 2 which will be contoured to achieve a finished contour 3. The head includes, typically, pole pieces 4 and 5 forming a gap 6. A mount 7 holds housing sections 8a, 8b, 8c and 8d. The entire assembly is held together by appropriate bonding and potting materials. The winding 8e may be wound about portions of the housing sections 8a through 8b during the assembly process.

Referring to FIG. 1B, a fully contoured head is shown in order to explain the nomenclature defining the limits of the contour 3. As will be explained later, the contour is formed by placing the head surface in contact with a lap plate or other abrasive surface. The contact occurs at one point at a time to form the contour 3. The loci of point of contact between the head and the abrasive surface are shown by the lines scanned on the contour 3. The point is shown as starting at one end of the head 1 and progressing in a direction along dimension L in a scanning motion. The final contour 3 may be defined by a number of radii extending from a number of axes. The longitudinal radius $R_L$ is defined as the radius extending from a center line 10 fixed beneath the head surface and perpendicular to the length L of the head. The longitudinal radius $R_L$ defines an arc 9 on the contour surface 3. The longitudinal radius position may be changed for different angles of $R_L$ relative to a fixed $R_L$; $R_L$ is shown as a single length for illustration only. The contour is also defined by a plurality of transverse radii $R_{t1}$, $R_{t2}$, $R_{t3}$, etc. Each of these transverse radii $R_t$ has an origin on a center line beneath the head contour 3 and parallel to the head length L. The length of the radii $R_t$ changes for each position along the length L. Thus, for example, the radius $R_{t1}$ extends from a center line 12, the radius $R_{t2}$ extends from a center line 14 and the radius $R_{t3}$ extends from a center line 16. Each of the transverse radii defines an arc on the contour surface 3. For example, the radius $R_{t1}$ defines the arc 11, radius $R_{t2}$ defines the arc 13 and radius $R_{t3}$ defines the arc 15. As shown in FIG. 1B, it is possible to bring the contour 3 of the head 1 into contact with the lap plate 17 to generate the loci of points shown by moving either the head 1 or the lap plate 17 to give the desired relative motion. In the embodiment described herein, the former type of motion will be described; however, it should be understood that only relative motion is important and that the stationary and moving parts of the embodiment could be reversed.

Figure 2A:
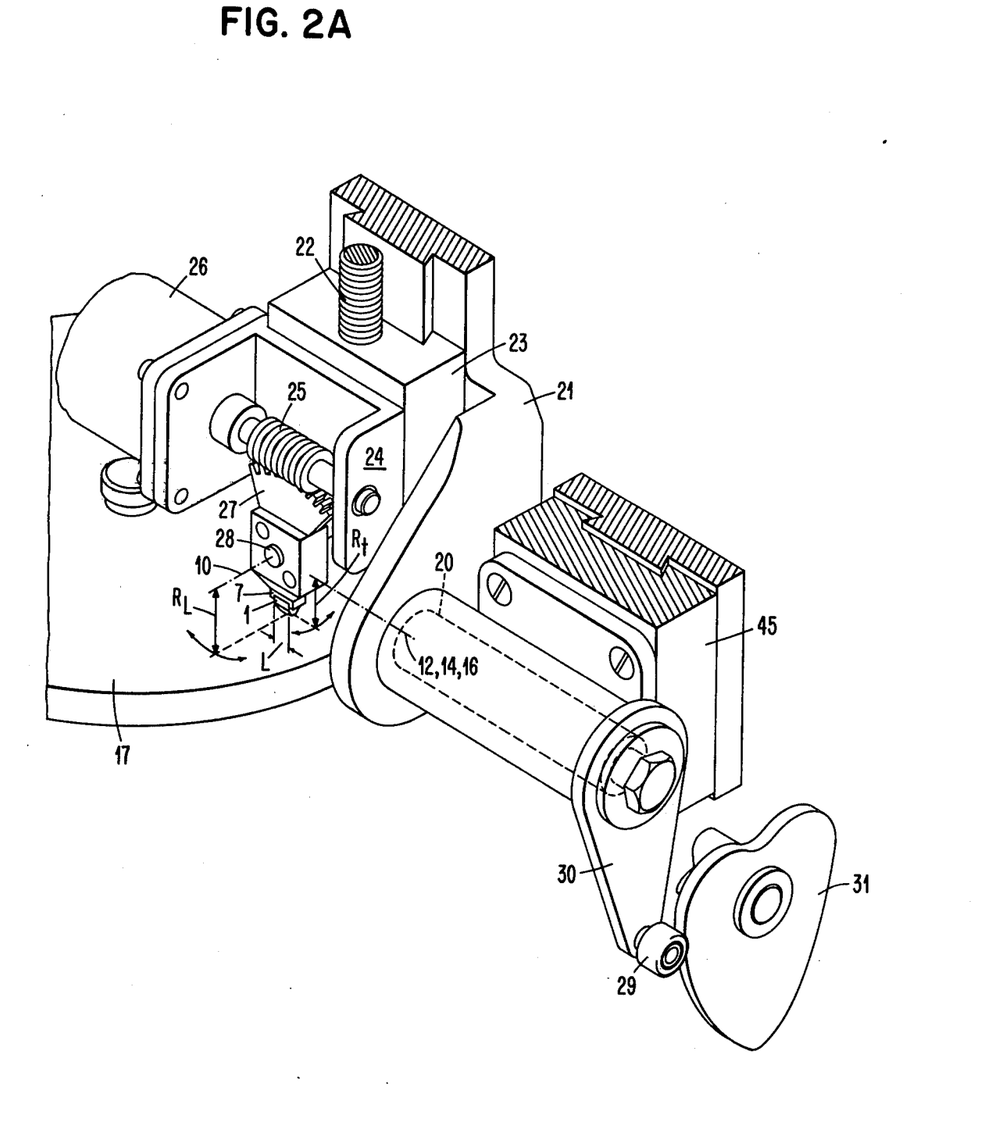
FIG. 2A is a detailed drawing showing a mechanism for defining and forming the contours shown in FIG. 1C.

The head 1 is shown mounted in an apparatus for contouring the head's surface in FIG. 2A. The head 1 is attached via its mounting section 7 to permit movement about a longitudinal rocking axis 10 and a transverse rocking axis 12, 14 or 16. As will be explained, the transverse rocking axes are infinitely variable, only three being described for illustration. The longitudinal rocking axis 10 swings the head through an arc defined by the radius $R_L$ as a result of the movement of a longitudinal motor 26 which drives a worm gear 25 and gear sector 27 attached to a longitudinal drive shaft 28. The longitudinal motor 26 thus generates an arc on the head 1 having a radius $R_L$ originating from the longitudinal rocking axis 10. The head 1 is maintained in contact with the lap plate 17 by means of a stepping motor, explained later with reference to FIG. 2B, which drives a lead screw 22 which in turn moves a backing plate 23 up and down in a dovetail groove or anti-friction slide relative to a base plate 21. The transverse radii $R_t$ are generated by changing the relative spacing of the contact point between the surface of the head 1 and the lap plate relative to the transverse rocking axes 12, 14 and 16 centered on a repositionable transverse rocking shaft 20. Shaft 20 repositioning is achieved by moving the base plate 21 up or down while maintaining the head 1 in contact with the lap plate 17 via appropriate adjustment of the lead screw 22. If the base plate 21 is moved up, the shaft 20 and the transverse rocking axis also move up (for example, axis 12) and the radius $R_t$ is lengthened. Conversely, if the base plate is moved down (for example, to axis 14), the radius $R_t$ is shortened. During operation, the base plate 21 is moved to change the transverse rocking axis so that $R_t$ is changed for different positions of the gear sector 27 to give a different $R_t$ for each arc increment along the radius $R_L$. Head contour to lap plate exposure is obtained by continuously rocking the transverse rocking shaft 20 from a cam follower 29 mounted on a transverse radius follower arm 30 as a cam 31 is rotated by a motor (not shown).

Figure 2B:
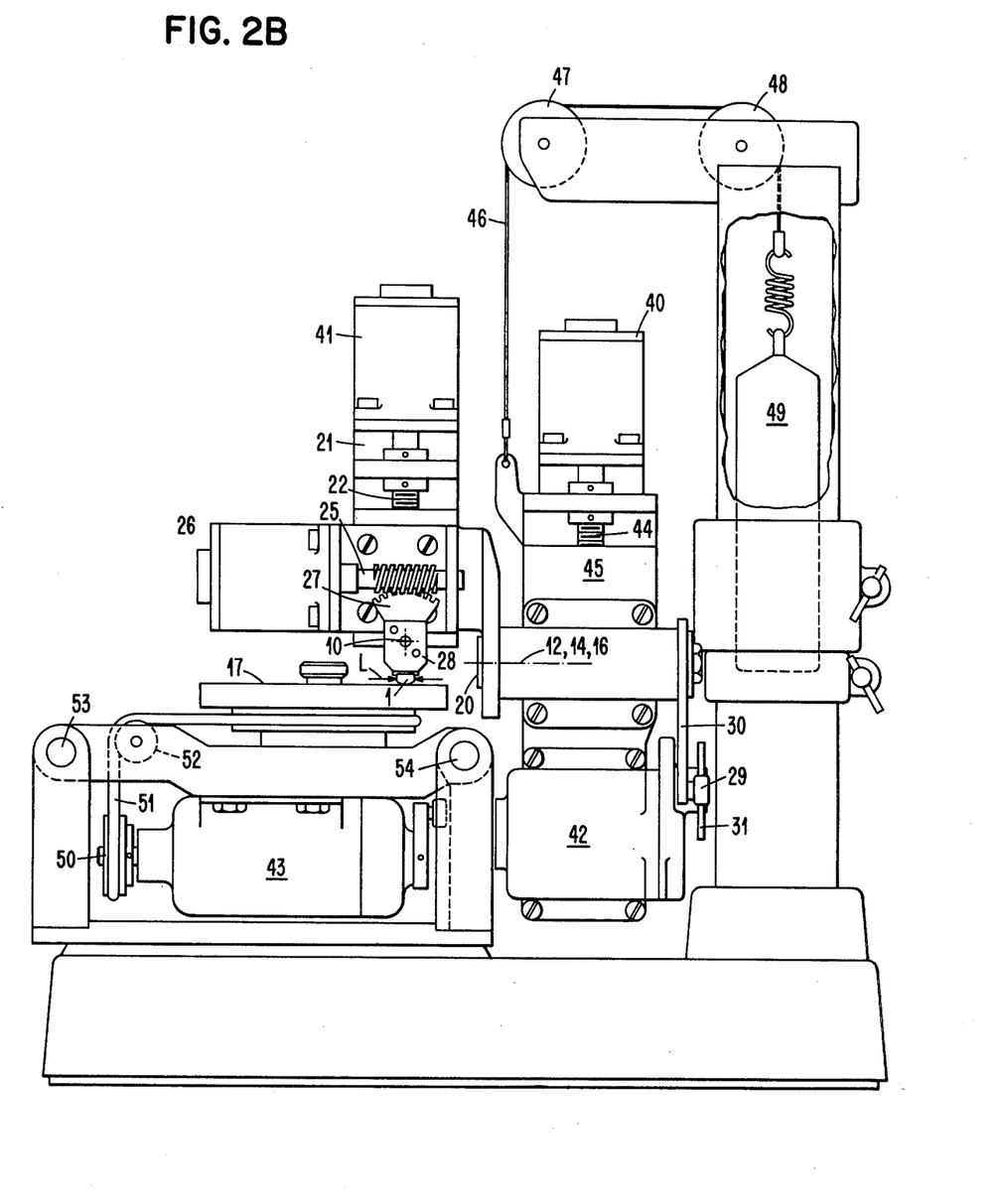
FIG. 2B shows auxiliary drive equipment necessary for the operation of the mechanism in FIG. 2A.

The subassembly of FIG. 2A is shown mounted in a complete contouring apparatus in FIG. 2B. The head 1 is shown across its length with the longitudinal rocking axis 10 perpendicular to FIG. 2B and the transverse rocking axes 12, 14 and 16 in the plane of the figure. A "Y" or "vertical" stepping motor 41 is shown connected to the lead screw 22 to maintain the head 1 in contact with the lap plate 17. A transverse cam motor 42 is shown connected to the cam 31 for driving the cam follower 29. A transverse radius stepping motor 40 drives a lead screw 44 connected to a support 45 for shaft 20 to move the base plate 21 up and down, which in turn adjusts the position of the transverse rocking axes 12, 14 and 16. It will be noted that the movement caused by the motor 40 also moves the longitudinal motor 26 and the vertical stepping motor 41, and the motion caused by the transverse cam motor 42 rocks longitudinal motor 26 and vertical motor 41. While the motors 40, 41, 42 and 26 can be of various designs, for illustration here, the transverse cam motor 42 is a constantly rotating DC motor, whereas the longitudinal motor 26, the vertical stepping motor 41 and the stepping motor 40 are incremental steppers. Any motor that accurately tracks a displaceable distance could be substituted for the motors 40, 41 and 26. A lap drive motor 43 is provided to rotate the lap plate 17 via a pulley 50 and belt 51 passing over idlers 52. The lap plate mechanism is mounted on guide rods 53 and 54 to permit linear motion of the lap plate 17 during rotation so that different abrasive tracks are presented to the head 1 to give even lap plate 17 wear. If desired, this may be automatically obtained with a cam and idler connected to the motor 43 as shown. The entire mechanism for generating transverse radii comprising the stepping motor 40, transverse cam motor 42 and the base plate 21 is counterbalanced by a cable 46 threaded over idlers 47 and 48 to a counterweight 49. This mechanism could be replaced by an appropriate spring or other return mechanism.

Figure 3:
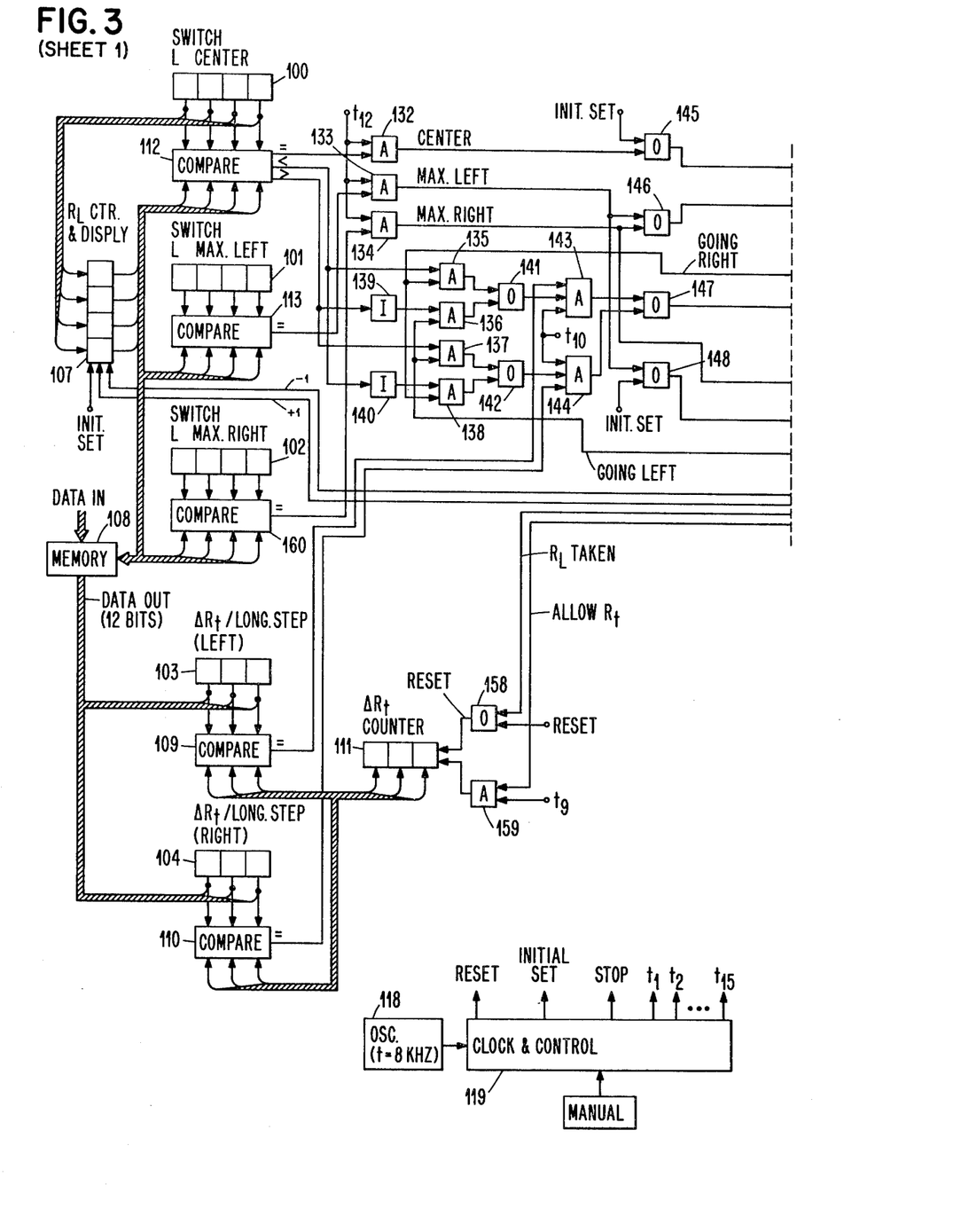
FIG. 3 is a logic diagram showing the controls for operating the machine of FIGS. 2A–2B.

The electronic controls for operating the motors 26, 40, 41, 42 and 43 will now be described with reference to FIG. 3. The transverse stepping motor 40 may be incrementally stepped up or down manually via OR circuits 130 and 131, and automatic stepping is supplied by inputs to the OR circuits as will be described. Similarly, the longitudinal stepping motor 26 is stepped right or left via corresponding OR circuits 126 and 127. The vertical stepping motor 41 is stepped up and down through OR circuits 151 and 152. The lap drive motor 43 is turned on by a signal on the line marked "on," and the transverse cam motor is turned on in a similar fashion. An oscillator 118 and clock and control 119 (including manual control inputs) are provided to properly cycle the logic necessary to drive the motors. The oscillator 118 operates at a frequency appropriate to the rate of operation of the motors, which, for illustrative purposes only, may be 8 KHz. The clock 119 will cycle through 15 clock periods T1 through T15 as the result of each 15 sequential pulses received from the oscillator 118.

The contouring machine is initially set to provide a defined contour by placing predetermined input data defining the limits of the contouring dimensions in switches 100 through 106. The actual positions of the motors are monitored by counters 107, 111, 114 and 116 which performs a registering function. A display is connected to counter 107, and others if desired, for monitoring, indicating purposes. The contents of the switches and counters are compared in comparators 109, 110, 112, 113, 115, 117, and 160. The results of the comparisons are supplied to logic comprising AND, OR, invert and flip-flop circuits to control the motors. The outputs of the comparator circuits are also used to supply some of the control information; for example, the transverse radius $R_t$ may be changed for each step along the longitudinal direction of the head 1. This latter operation is assisted by providing a memory 108 which stores changes in transverse radius required for each step along the head direction L.

For a head having a length L, the center and end dimensions, defined as $L_{center}$, $L_{max\ left}$ and $L_{max\ right}$, are entered into corresponding ones of switches 100, 101 and 102. Each time that the longitudinal stepping motor 26 is stepped right, in the direction of an increasing L dimension, the L counter and display 107 is increased +1. Each time that the longitudinal stepping motor 26 is stepped left one increment, the counter and display 107 is decremented −1. Thus, if the clock 119 was initially set to the value of $L_{center}$ switch 100, the counter and display 107 will thereafter indicate the angular position of the head 1 relative to the lapping plate 17. This information from the counter and display 107 is supplied to the comparators 112, 113 and 160 for comparison with the predetermined quantities entered into the switches 100, 101 and 102. Whenever the head has been stepped by the longitudinal stepping motor 26 to an end position $L_{max\ left}$ or $L_{max\ right}$ the corresponding comparator 113 or 160 will indicate on the appropriate comparator output line that a limit has been reached. These outputs are supplied to reverse the longitudinal stepping motor 26 and to adjust the transverse radius stepping motor 40. The output of the counter and display 107 is also supplied to the address input of the memory 108 which has been previously loaded with a table relating possible counter and display 107 quantities with desired changes in transverse radius. Therefore, for each address supplied to the memory 108, data will be supplied to data out lines connected to comparators 109 and 110 as an alternative to supplying information via switches 103 and 104. The information from the memory 108 is compared in the comparators 109 and 110 with the current position of the transverse stepping motor 40 to ultimately control stepping of the longitudinal stepping motor 26. The transverse stepping motor 40 is stepped up if an Allow $R_t$ signal appears at inputs to AND circuits 128 and 129 at time $t_8$ if flip-flop 120 output "0" is up. It is stepped down if an input occurs at time $t_1$ and flip-flop 120 output "1" is up. The Allow $R_t$ signals increment the counter 111 +1 at time $t_9$ via AND circuit 159. When the comparators 109 or 110 indicate that the contents of the counter 111 equals the value supplied to either comparator 109 or 110 by the memory 108, the corresponding one of the equality outputs of the comparators 109 and 110 is supplied to AND circuits 143 and 144 to enable the longitudinal stepping motor 26 to advance in either the right or the left position. The value supplied by the memory 108 to the comparator 109 indicates the change in transverse radius for each longitudinal step left of the value placed in the switch 101. The value supplied to the comparator 110 indicates the change in transverse radius for longitudinal steps to the right of the quantity stored in the switch 101.

Each change in radius dictated by the memory 108, or, if desired, by quantities set in the switches 103 and 104, must be compensated for by changing a vertical stepping motor 41 to maintain contact between the surface of the head 1 and the lap wheel 17. However, abrasion will not occur unless the stepping motor 41 feeds the head 1 into the lap wheel 17. Thus, there must be an increment of change between the change in the transverse radius and the amount of compensation provided by the vertical stepping motor 41. The exact amount of this change is specified by the quantity set in the switches 105. The stepping motor 41 is permitted to advance, at the maximum left and maximum right extremes indicated by a signal from OR circuit 146, if the contents in the switch 105 and the counter 116 are not equal. However, whenever the comparator 117 indicates an equality, a signal emerges from the AND circuit 157 at time $t_{13}$, to prohibit further advance of the stepping motor 41. Also, a maximum quantity of penetration by the stepping motor 41 is specified in a switch 106. The actual position of the stepping motor 41 is indicated by the contents of the counter 114 which is incremented whenever the stepping motor 41 is driven downward toward the lap wheel 17 and which is decremented −1 whenever the stepping motor 41 is lifted from the lap wheel 17 by an "up" signal. When the penetration indicated in the counter 114 equals the maximum allowed as indicated by the switch 106, there will be an equality signal from the comparator 115 through the AND circuit 157 at time $t_{13}$ stopping further stepping of the motor 41.

There are provided a number of flip-flops for controlling the direction of the motors. The flip-flop 120 controls the direction of the transverse stepping motor 40. When the transverse radius is to be decreased, the flip-flop 120 is in the "0" state, enabling AND circuit 128 which will, at time $t_8$, cause stepping motor 40 to step upward one step if there is no signal into the inverter 170. That is, the motor 40 is blocked from stepping if there is an external stop signal, a signal indicating that no transverse radius is to be used, or if the vertical stepping motor 41 is currently advancing. If the transverse radius is to be lengthened or increased the flip-flop 120 is in the "1" state activating an output from AND circuit 129 at time $t_1$ to drive the transverse stepping motor 40 down. Again, AND circuit 129 will operate only if the inverter circuit 170 is not receiving the Stop, No $R_t$, or Advance Y signals. Stepping of the longitudinal motor 26 is controlled by flip-flops 121 to 122 to move the point of head-lap wheel contact on an arc lying in the direction of dimension L in FIG. 1B. When the flip-flop 121 is set to the "1" state, the AND circuits 124 and 125 are enabled to pass a signal from the flip-flop 122 indicating the direction in which the stepping motor is to step at time $t_{10}$. When the flip-flop 122 is in the "0" state, the stepping motor is stepped right one increment, and when it is in the "1" state, it is stepped left one increment. The advance of the vertical stepping motor 41 in a downward direction is controlled by the flip-flop 123. At time $t_1$, when the flip-flop 123 is not in the "1" state, the AND circuit 150 will have an output from the inverter circuit 170 and the OR circuit 152 will have an output from the AND circuit 154 to step the motor 41 down one increment. The stepping motor 41 is stepped up at time $t_8$ whenever the flip-flop 120 increments the stepping motor 40 and is also stepped down whenever the flip-flop 120 decrements the stepping motor 40. Thus, the stepping motor 41 moves in the opposite direction from the stepping motor 40 and is also stepped down in accordance with signals from the flip-flop 123.

The flip-flops 120 through 123 are controlled by the comparators via logic to be described. The flip-flop 120, which determines the direction that the stepping motor 40 is stepped, is set to the "1" state at time $t_{12}$ by OR circuit 145 if the AND circuit 132 indicates that the current longitudinal position of the stepping motor 26, as indicated by the counter and display 107, equals the center longitudinal position set in the switch 100. This occurs as a signal from the comparator 112 equality output. Similarly, at time $t_{12}$, the flip-flop 120 will be reset by a signal from OR circuit 146 whenever the AND circuit 133 indicates that the leftmost position of the longitudinal stepping motor 26 has been reached or the AND circuit 134 indicates that the rightmost position has been reached. The flip-flop 121, which allows an additional longitudinal step of the motor 26, is regularly reset at time $t_{11}$. The flip-flop 121 is set to the "1" state by a signal from OR circuit 147 when a signal occurs at time $t_{10}$ from either AND circuit 143 or 144. This occurs when the change in transverse radius per longitudinal step equals that specified by either the memory 108 or by one of the switches 103 or 104 as long as the comparator 112 indicates that the operation is occurring between the center of the distance L and one of the specified end limits in the switches 101 and 102. That is, the operation must change if the center line indicated by the quantity in the switch 100 is crossed.

If the comparator 112 indicates that the quantity in the counter and display 107 is less than the switch setting 100, an output from the comparator 112 on the "less than" output line is supplied to AND circuit 135 and inverter 140. As a result, AND circuit 135 will have an output if the flip-flop 121 indicates that the stepping motor is going right, supplying an enabling input to AND circuit 143 via an OR circuit 141 to set flip-flop 121 to allow further increments to be taken. The input to the inverter 140 blocks the AND circuit 138 which would normally supply a signal via the OR circuit 142, when the stepping motor is going right, to set the flip-flop 121 to the "1" state. When the comparator 112 has a "more than" output as a result of the counter and display 107 quantity being larger than the quantity set in the switch 100, there will be a signal applied to the AND circuit 137 and to the inverter 139. When the flip-flop 122 indicates that the stepping motor 26 is going left, there will be an output from the AND circuit 137 through the OR circuit 142 to enable the AND circuit 144 to set the flip-flop 121 to be the "1" state to permit further longitudinal steps to be taken. The input to the inverter 139 blocks the AND circuit 136 which would normally have permitted the flip-flop 121 to be set to the "1" state, when the comparator 109 output occurs. The flip-flop 123 which controls the advance of the vertical stepping motor 41 is normally set to the "1" state by the presence of an indication from OR circuit 146 that the head is in a maximum left or right position as indicated by the switches 101 or 102. This will allow motor 41 to move down the number of steps set into switch 105. At other times, when the flip-flop 123 is in the "0" state, the vertical stepping motor 41 may be stepped normally at times $t_1$ and $t_8$ as indicated by enabling signals to AND circuits 149 and 150. The flip-flop 123 is placed in the "0" state by an indication from the comparator 117 that the amount of downfeed desired as indicated in the switch 105 equals the actual change in the vertical stepping motor 41 as indicated in the counter 116. The flip-flop 123 is also reset by an input to the OR circuit 156 from the comparator 115 specifying tha the maximum penetration permitted by the switches 106 has been achieved as indicated by the counter 114.

EXAMPLE OF OPERATION

The operation of the invention will now be described with particular reference to the diagram of FIG. 4. The length of the arc L, defined by the dimension L, of the head 1 extends a distance of 10 degrees in each direction from the position of the gap 6. The longitudinal motor 26 steps the head in the direction L an incremental distance of 0.01875° per step. For each of these steps, a different transverse radius is defined. The minimum transverse radius occurs at $L_{center}$ which is $-1.5°$ or 80 steps to the left of the head gap. The maximum right side transverse radius occurs at 6° or 7.5° (400 steps) from the minimum transverse radius point. The left side maximum transverse radius occurs at a point which is defined as $-8.5°$ or 7° (373 steps) to the left of the minimum radius point. Connecting these three points together, as shown in FIG. 4, will give an indication of the amount of transverse radius adjustment and vertical penetration required by the motors 40 and 41.

Figure 4:
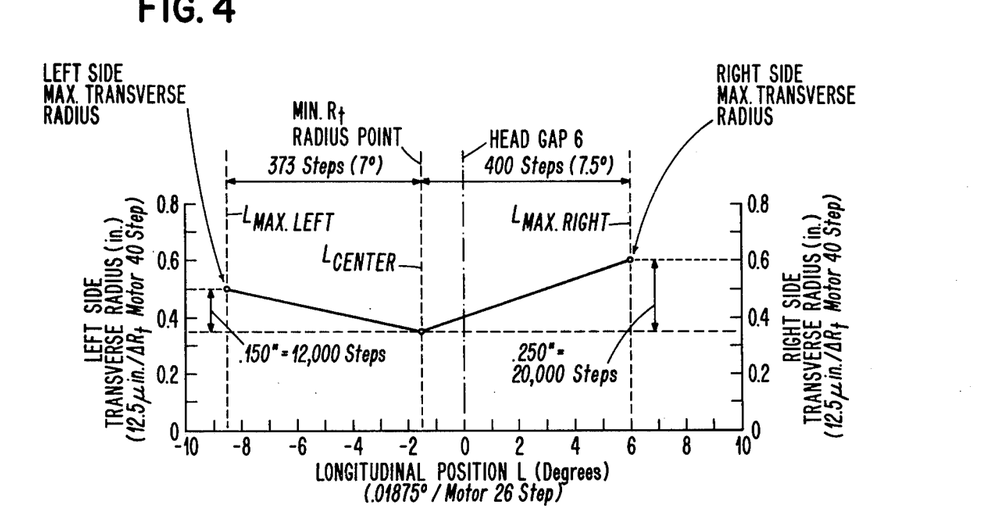
FIG. 4 is a graph used in illustrating the operation of an apparatus incorporating the machine and controls of FIGS. 2A–2B and 3.

The center maximum left and maximum right switches 100 through 102 are first set in accordance with the diagram of the desired head contour given in FIG. 4. The point of minimum transverse radius is defined as the $L_{center}$ position for switch 100. This point of minimum transverse radius is 1.5° to the left of the head gap. Therefore, the longitudinal motor 26 must be stepped 80 times to the left to reach this position. This is derived by dividing the distance 1.5° by the incremental stepping of 0.01875° per step of the motor 26. Since the head gap is at the position 0 which, may arbitrarily be defined as 1,000, this number is entered into the switch 100. Then, upon the occurrence of an initial set signal from clock 119, the number is also entered into counter 107. The quantity 1,000 is arbitrarily chosen as the head gap position by the stepping of the motor 26. The maximum left switch setting 101 and maximum right setting 102 can be derived by similar techniques. As can be seen from FIG. 4, the right limit of the head is 7.5° from the minimum transverse radius point. Since the longitudinal motor 26 moves 0.01875° per step, it will take 400 steps to the right to move the right end of the head into contact with the lap plate 17. If the 400 steps are added to the arbitrary center position 1,000, then the quantity 1,400 should be set into the maximum right switches 102. Similarly, 373 steps are subtracted from the center position of 1,000 to give a quantity 627 to be set into the maximum left position switches 101. These two settings will cause the longitudinal motor 26 to swing the head from end to end. If at any time the longitudinal position indicated in the counter 107 exceeds either the maximum left position indicated in the switches 101 or the maximum right position indicated in the switches 102, an error condition exists which should stop the machine or otherwise indicate that a problem has occurred.

Next, the radius change per longitudinal step of the motor 26 is determined and set into the switches 103 and 104. Alternatively, a table could be entered via the data-in bus in the memory 108. In FIG. 4, the minimum transverse radius is 0.35 inch and the transverse radius at the right side of the head is 0.60 inch. The radius change from the minimum to the right side of the head is, therefore, 0.25 inch. Since each step of the transverse radius stepping motor 40 changes the radius by 12.5 microinches, 20,000 steps are required to go from a radius of 0.35 to 0.60 inch. This is arrived at by dividing the radius change 0.25 inch by the change in radius 12.5 microinches per step. Previously, it was determined that 400 steps of longitudinal motion by the motor 26 were required to move from the minimum transverse radius point to the right edge of the head. Therefore, it follows that 50 transverse radius change steps are required for each longitudinal step. Therefore, the number 50 is set into the switches 104. Similarly, the number 32 is calculated and placed into the left switches 103. Some rounding off is involved in this calculation because 373 longitudinal steps to the left with 32 radius changes per longitudinal step to the left results in 11,936 radius steps, whereas 12,000 should actually be taken. This is an error of approximately 0.8 mils.

Also, the settings of maximum left and right switches 101 and 102 cause the longitudinal stepping motor 26 to reverse motion exactly at the ends of the head 1. This reversal should desirably take place when the head is not in contact with the lap plate 17. Therefore, more longitudinal steps should be taken in each direction so that some overtravel occurs before the reversal and lowering of the head takes place. Arbitrarily, 1° (approximately 53 steps) should occur past the ends of each head. It is, therefore, advisable to add 53 to the maximum right switches 102 and subtract 53 from the maximum left switches 101.

The downfeed or maximum vertical direction switch 105 indicates the amount of change in the stepping motor 41 in a downward direction after each complete pass of the head 1 in the longitudinal direction L over the surface of the lap plate 17. The amount of downfeed is determined by the material of the head 1 and the lap plate 17. As an example, for a ferrite head and a lap plate containing diamond or boron-carbide abrasive the quantity 12.5 microinches may be inserted in the switch 105 to indicate that the stepping motor 41 is advanced 12.5 microinches downward at the end of each complete longitudinal sweep by the stepping motor 26. The maximum penetration allowed is entered in the switches 106. When the maximum penetration indicated by the counter and display 114 equals the maximum penetration allowed as indicated in the switches 106, all operations stop and the head is removed from contact with the rotating lap plate. Since the left and right ends of the head usually will have a larger transverse radius than the middle of the head, the position of the vertical stepping motor 41 will be greatest when the transverse radius is the largest. As shown in FIG. 4, the right side has the largest radius requiring 22,650 penetration steps of the motor 41 to get to the maximum right position. This is arrived at by multiplying 453 longitudinal steps of the motor 41 times 50 radius changes per longitudinal step as set into the switches 104. If it is desired to remove a fixed amount of material from the head, for example 2,000 microinches, the quantity 22,810 is set into the switches 106. This is arrived at by dividing the material to be removed, 2,000 microinches, by the amount of material, 12.5 microinches, to be removed per longitudinal sweep. The quantity 22,650 is added to 160 to arrive at 22,810. This example assumes that the minimum transverse radius point is tangent to and in contact with the lap plate 17 at the start of operations.

Once the switches have been set up and the head 1 is placed in the work holder preparatory to starting contouring of the surface 3, a reset signal resets all the flip-flops 120 through 123 and a clear signal sets the counter 107 to the value of switches 100. An initial set signal sets the flip-flop 120 and resets the flip-flop 122. The oscillator 118 drives the clock 119 through sequential steps $t_1$ through $t_{15}$. The lap drive motor 43 is turned on, the transverse cam motor 42 is turned on and contouring commences. At times $t_1$, signals enable AND circuits 150 and 154 to permit downward stepping of the vertical stepping motor 41 and the stepping motor 40 to change the transverse radius. At times $t_8$, the transverse radius is changed by stepping the motor 40 upward via AND circuit 128 and a compensating adjustment of the vertical stepping motor 41 is made via AND circut 149. At times $t_{10}$, the longitudinal stepping motor 26 is incremented in either the left or the right direction, and at times $t_{11}$, the flip-flop 121 is reset preparatory to the next increment of the stepping motor 26 at the next time $t_{10}$. At each time $t_{12}$, the flip-flop 120 is enabled for permitting a change in the stepping motor 40 via AND circuits 132, 133 and 134. The longitudinal stepping motor 26 continues to move the head relative to the lapping plate one increment at a time, which increment is determined by the worm gear 25. For each increment of motion, the transverse cam motor 42 causes the head to move in a direction perpendicular to the lap plate at least once. The radius of motion $R_t$ is determined by the position of the stepping motor 40 and the compensating motion of the stepping motor 41. The difference between the motions of the stepping motors 40 and 41, as determined by the quantity stored in the switches 105, determines the degree of penetration during each cutting motion. The quantity stored in the switches 105 is used to adjust the difference between the motors 40 and 41 whenever the left or the right end of the head 1 is reached as indicated by an equality signal from one of the comparators 113 and 160. The amount of adjustment of the stepping motor 40, and therefore the compensating adjustment of the stepping motor 41, is determined by the quantity supplied to the comparators 109 and 110 by either the switches 103 and 104 or the memory 108. The position of the head relative to a center position indicated by switches 100, determined whether the output of comparator 109 or comparator 110 is used to control stepping of the motors 40 and 41. When the total motion of the vertical stepping motor 41 equals the predetermined amount set in the switches 105, an equality indication from the comparator 115 terminates operation.

While the invention has been particularly shown and described with reference to preferred embodiments thereof, it will be understood by those skilled in the art that various changes in form and details may be made therein without departing from the spirit and scope of the invention.

What is claimed is:

1. A method for contouring a transducer surface by holding it in contact at one point with a surface removal device, including the steps of:
   first, moving the contact point in first and second opposite directions on the surface;
   second, rocking the contact point, around points on an axis, in third and fourth opposite directions on the surface intersecting the first and second directions; and
   third, causing the contact point to advance in the first direction while following a plurality of parallel lines on the surface lying in the third and fourth directions.

2. The method of claim 1 further including the steps of:
   fourth, indicating the current position of the contact point in the first direction;
   fifth, specifying a desired limit position of the contact point in the first directon; and
   sixth, reversing the motion of the contact point to move in the second direction when the limit position is reached.

3. The method of claim 1 further including the step of:
   fourth, changing the position of the rocking axis relative to the contact point.

4. The method of claim 3 wherein the fourth step includes:
   changing the position of the rocking axis as a function of the position of the contact point in the first and second directions.

5. Contouring a surface on a magnetic transducer, having longitudinal and transverse axes, using a method comprising the steps of:
   holding a magnetic transducer to expose its surface for the formation of a contour;
   removing material from the surface;
   reciprocating the transducer through an arc defined by transverse radii extending perpendicularly from the transverse axis to the transducer surface;
   simultaneously reciprocating the transducer through a longitudinal arc defined by the longitudinal axis; and
   changing the transverse radii by moving the transverse axis relative to the transducer surface as a function of transducer reciprocation through the longitudinal arc.

* * * * *